UNITED STATES PATENT OFFICE.

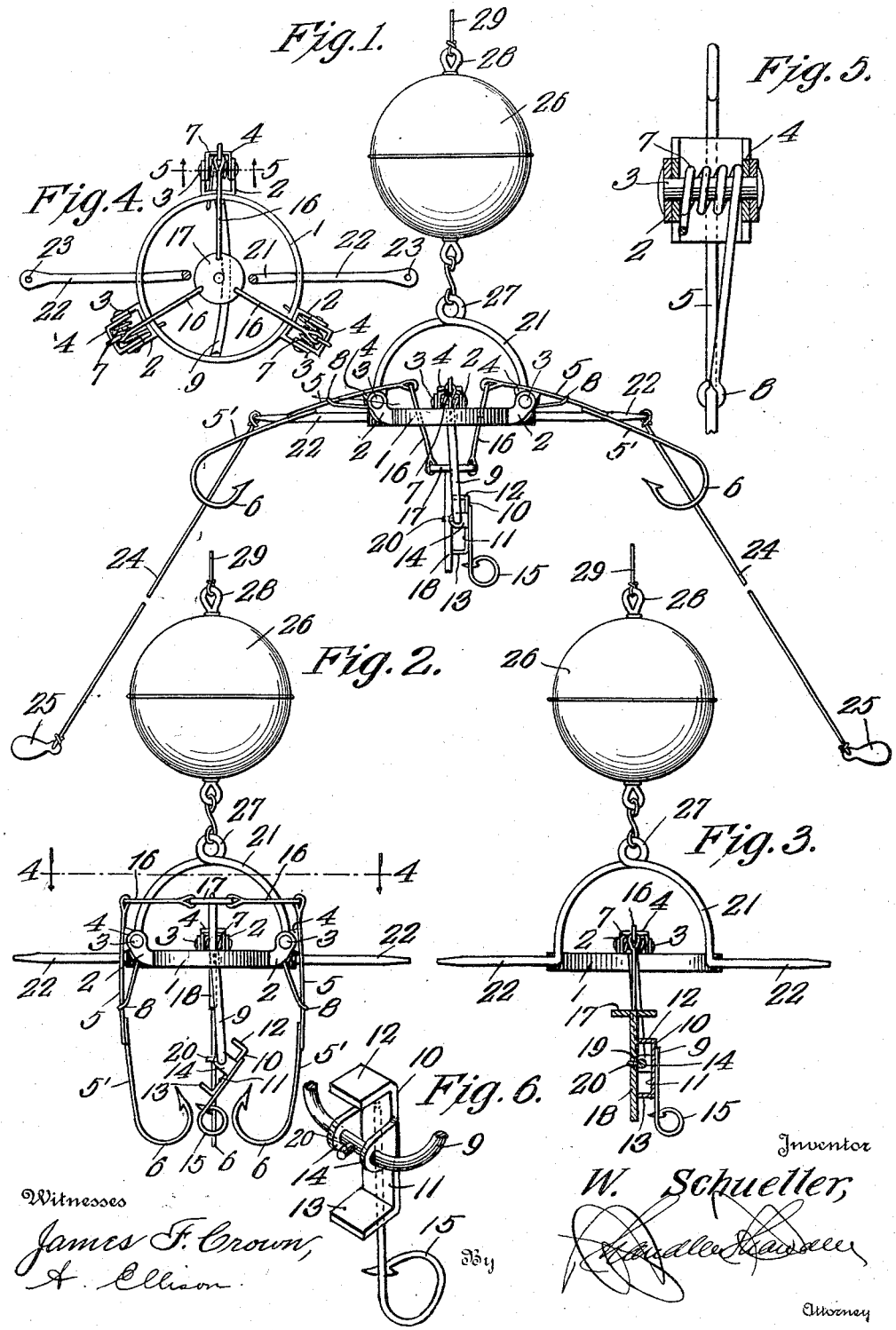

WILLIAM SCHUELLER, OF MASPETH, NEW YORK.

FISH-HOOK.

1,189,631.     Specification of Letters Patent.     Patented July 4, 1916.

Application filed February 28, 1916. Serial No. 80,984.

*To all whom it may concern:*

Be it known that I, WILLIAM SCHUELLER, a citizen of the United States, residing at Maspeth, Long Island, in the county of Queens, State of New York, have invented certain new and useful Improvements in Fish-Hooks; and I do hereby declare the following to be a full, clear, and exact description of the invention, such as will enable others skilled in the art to which it appertains to make and use the same.

The present invention is directed to improvements in fish hooks, and has for its object to provide a device of this character constructed in such a manner that the same can be set and will automatically operate upon a fish nibbling upon the bait suspended on the bait hook.

A further object of the invention is to provide a fish hook comprising a plurality of spring pressed hooks adapted to be simultaneously released for catching a fish which attempts to take the bait.

A still further object of the invention is to provide novel means for simultaneously releasing the spring pressed hooks.

With these and other objects in view, this invention resides in the novel features of construction, formation, combination and arrangement of parts to be hereinafter more fully described, claimed and illustrated in the accompanying drawing, in which:—

Figure 1 is a side elevation of the device in its set position. Fig. 2 is a similar view in its released position. Fig. 3 is a vertical central sectional view through Fig. 1. Fig. 4 is a sectional view on line 4—4 of Fig. 2. Fig. 5 is a sectional view on line 5—5 of Fig. 4. Fig. 6 is a detail perspective view of the trigger.

The device consists of a ring 1 having carried thereby preferably, three sets of spaced ears 2 which support pins 3 and to which are pivotally connected the brackets 4, said brackets being fixed to the rods 5 which support the shanks 5' of the hooks 6. Encircling the pins 3 are coil springs 7 said springs having one of their terminals fixed to the ring 1 and their other terminals provided with eyes 8 which slidably engage the rods 5 of the hooks, said springs serving to urge the hooks toward each other.

Supported by the ring 1 is a U-shaped hanger 9 which pivotally supports the trigger 10. The trigger 10 is formed from sheet metal and consists of a plate 11, the ends of which terminate in right angle flanges 12 and 13. Spaced ears 14 are carried by the plate 11 and are pivotally connected to the bight of the hanger 9. Suitably connected to the plate 11 is the shank of the bait suspending hook 15.

To the upper ends of the rods 5 are pivotally connected the outer ends of the links 16, the inner ends of which are pivotally connected to the disk 17, from which depends a bar 18, said bar having an opening 19 formed therein, which is adapted to engage the lug 20 to hold the hooks 6 in their set position. The lug 20 is carried by the bight of the hanger 9, and is located between the ears 14. Thus it will be seen that when the lug is engaged in the opening 19 that the flanges 12 and 13 will engage the bar 18. When a fish nibbles on the bait on the hook 15, the trigger 10 will be rocked thereby swinging the bar 18, which action releases the lug 20 from the opening 19, whereupon the hooks 6 will, under the action of the springs 7, swing the hooks simultaneously toward each other, thus catching the fish. By providing the upper and lower flanges 12 and 13, it is obvious that the trigger will swing the bar 18 when the trigger is rocked either to the right or left.

A bail 21 is provided and has its ends terminating in arms 22 which pivotally engage the ring 1 and extend laterally therefrom. The outer ends of the arms 22 are provided with eyes 23 and in which are secured the upper ends of the lines 24, the lower ends of said lines having fixed thereto sinkers or weights 25, which rest on the river bed and anchor the device in the desired place.

The device is suspended in the water by a ball float 26 which is connected in any suitable manner to the eye 27 formed on the bail 21. The float is provided with an eye 28, and to which the pulling-in line 29 is attached. The device can be suspended at any distance from the river bed upon lengthening or shortening the lines 24.

What is claimed is:—

1. A device of the class described, comprising a ring, rods pivotally connected to the ring, hooks supported by the rods, a hanger supported by the ring, a trigger pivotally connected to the hanger and having a bait receiving hook carried thereby, a disk, links pivotally connecting the upper ends of the rods and disk, a bar carried by the disk, means carried by the trigger for engaging the bar to hold the hooks in their set positions, a bail connected to the ring, and a float connected to the bail, as and for the purpose set forth.

2. A device of the class described, comprising a ring, a bail having its ends terminating in arms for pivotal engagement with the ring, a float connected with the bail, spring pressed rods pivotally associated with the ring, hooks carried by the rods, a trigger pivotally connected to the bail which is supported by said ring, said trigger having upper and lower flanges, a bait receiving hook carried by the trigger, a lug carried by the hanger, a disk, links pivotally connecting the links and upper end of said rods, a bar carried by the disk, and having an opening formed therein for engaging said lug and at which time the flanges of the trigger engage said bar, said flanges serving to swing the bar to disengage the opening therein from said lug when said trigger is actuated, thereby releasing said bar to permit the hooks to swing inwardly, and means connected to said arms for anchoring the device.

In testimony whereof, I affix my signature, in the presence of two witnesses.

WILLIAM SCHUELLER.

Witnesses:
HERMAN RINGE,
JOHN BERBRICK.

Copies of this patent may be obtained for five cents each, by addressing the "Commissioner of Patents, Washington, D. C."